United States Patent
Artini et al.

(10) Patent No.: US 7,467,030 B2
(45) Date of Patent: Dec. 16, 2008

(54) FLIGHT CONTROL INDICATOR FOR AN AIRCRAFT

(75) Inventors: Franck Artini, Toulouse (FR); Jean-Pierre Demortier, Maurens (FR); Christophe Bouchet, Toulouse (FR); François Barre, Plaisance du Touch (FR)

(73) Assignee: AIRBUS France, Toulouse (FR)

( * ) Notice: Subject to any disclaimer, the term of this patent is extended or adjusted under 35 U.S.C. 154(b) by 610 days.

(21) Appl. No.: 11/121,053

(22) Filed: May 4, 2005

(65) Prior Publication Data
US 2005/0273222 A1 Dec. 8, 2005

(30) Foreign Application Priority Data
May 18, 2004 (FR) .................................. 04 05382

(51) Int. Cl.
*G01C 23/00* (2006.01)
(52) U.S. Cl. ............................. 701/3; 701/14; 701/207; 340/945; 340/959
(58) Field of Classification Search .................... 701/3, 701/4, 13, 14, 207; 340/945, 959, 960, 980; 244/158.1, 75.1
See application file for complete search history.

(56) References Cited

U.S. PATENT DOCUMENTS

| 5,922,031 | A | 7/1999 | Larrieu |
| 6,112,141 | A | 8/2000 | Briffe et al. |
| 6,690,299 | B1 | 2/2004 | Suiter |
| 2003/0132860 | A1 | 7/2003 | Feyereisen et al. |
| 2003/0222887 | A1 | 12/2003 | Wilkins, Jr. et al. |

FOREIGN PATENT DOCUMENTS

FR 2741320 5/1997

OTHER PUBLICATIONS

Preliminary Search Report dated Jan. 26, 2005 with English translation.
Preliminary Search Report dated Jan. 26, 2005 with English translation.

*Primary Examiner*—Gertrude Arthur Jeanglaud
(74) *Attorney, Agent, or Firm*—Dickinson Wright, PLLC (57) ABSTRACT

A flight control indicator for an aircraft includes a central unit that determines a change of vertical or lateral trajectory. A display, which may present a first indicator of a next vertical change and a second indicator of a next lateral change, presents the one of the first and second indicators indicating the change of trajectory which is closest from the current position of the aircraft.

29 Claims, 9 Drawing Sheets

FLIGHT CONTROL INDICATOR FOR AN AIRCRAFT

FIELD OF THE INVENTION

The present invention relates to a flight control indicator for an aircraft which is guided along a flight trajectory.

BACKGROUND OF THE RELATED ART

Within the framework of the present invention, a flight trajectory comprises:
- a lateral trajectory comprising a plurality of successive lateral branches, which are rectilinear and each present a particular course; and
- a vertical trajectory comprising a plurality of successive vertical segments, which are rectilinear and each present a particular slope.

When the aircraft, for example a military transport plane, is guided along such a flight trajectory, the pilot is not forewarned of a change of trajectory, namely either a lateral change (corresponding to a change of lateral branch), or a vertical change (corresponding to a change of vertical segment). Hence, in particular when the pilot pilots the aircraft on the basis of orders provided by a flight director, he is not in a position to anticipate such a change of trajectory and must immediately follow the new orders provided by the flight director upon each change of trajectory. Such flight control is therefore very demanding for the pilot, especially at low altitude where the branch/segment distribution is random and very frequent.

SUMMARY OF THE INVENTION

The present invention relates to a flight control indicator for an aircraft, making it possible to remedy these drawbacks.

According to the invention, said flight control indicator is noteworthy in that it comprises:
- a central unit able to determine any change of trajectory corresponding to a vertical change which represents a change of vertical segment or a lateral change which represents a change of lateral branch; and
- means of display;
  - which are able to present, on at least one viewing screen:
    - at least one first means of indication indicating at least one next vertical change; and
    - at least one second means of indication indicating at least one next lateral change; and
  - which are formed in such a way as to present at least one of said first and second means of indication namely the one indicating the change of trajectory which is closest, from the current position of the aircraft (with a simple and intuitive portrayal).

Thus, by virtue of said flight control indicator, the pilot of the aircraft is informed at least of the next change of trajectory, thereby allowing him to anticipate this change of trajectory. The present invention therefore makes it possible to reduce the stress and the workload of the pilot of the aircraft, in such a flight phase presenting a change of trajectory, which is very demanding.

A flight control indicator in accordance with the invention may be applied to any type of trajectory comprising lateral branches and vertical segments as specified.

Advantageously, said means of display simultaneously present said first and second means of indication.

Within the framework of the present invention, said viewing screen can be a head-up screen or a head-down screen.

Use is preferably made of viewing screens already existing on the aircraft, this having the effect of reducing the cost and the bulk of the flight control indicator in accordance with the invention, and allows varied use.

In a first main embodiment, said first and second means of indication are autonomous on the viewing screen, with respect to other displays of said viewing screen.

Preferably, each of said first and second means of indication comprises an arrow.

Firstly, advantageously, said first means of indication comprises an arrow which is directed:
- upward, if the next vertical segment presents a positive slope; and
- downward, if the next vertical segment presents a negative slope.

Secondly, advantageously, said second means of indication comprises an arrow which is directed:
- rightward, if the next lateral branch is attained through a rightward rotation; and
- leftward, if the next lateral branch is attained through a leftward rotation.

This allows the pilot not only to anticipate a next change of trajectory, but moreover makes it possible to inform him of the type of change of trajectory scheduled (with a new vertical segment with positive or negative slope, or else a new lateral branch requiring a rightward or leftward rotation).

In a particular embodiment, the length of said arrow is dependent on a particular intensity (slope, turning radius) relating to the next change of trajectory and each of said first and second means of indication comprises, moreover, at least one bar which is associated with said arrow and which makes it possible to present a limit intensity for the next change indicated.

In this case, advantageously:
- said first means of indication comprises a single bar which indicates the maximum slope that the aircraft can fly; and
- said second means of indication comprises two bars which indicate, respectively, the minimum and maximum turning radii that the aircraft can fly.

This particular embodiment therefore makes it possible to present, in addition, information relating to the difficulty of the next change of trajectory and the remaining margin of maneuver, with respect to the maximum capabilities of the aircraft.

In another particular embodiment, each of said means of indication comprises, moreover, a clock which indicates the time remaining until the next change of trajectory, lateral or vertical.

Advantageously, said clock is presented in the form of a circle, the representation of which diminishes progressively so that the remaining part is proportional to said remaining time. In this case:
- in a first variant, the remaining time, indicated by a complete circle, corresponds to a predetermined duration; and
- in a second variant, the time remaining, indicated by a complete circle, corresponds to a predicted duration of flight of the aircraft, between the last change of trajectory and the next change of trajectory.

Moreover, in a first variant, said first and second means of indication are autonomous on the viewing screen, the one with respect to the other, whereas in a second variant, said means of display present a global indicator comprising at least two means of indication and a single clock.

In this second variant, advantageously, said means of display present said two means of indication of said global indicator in a differentiated manner.

Moreover, in this second variant, advantageously:

said means of display reupdate said global indicator, with each change of trajectory; and/or said means of display depict, on a means of indication of said global indicator, as the case may be, the number of next and consecutive changes relating to the type of change of trajectory indicated by this means of indication.

Furthermore, advantageously:

in a first variant, said means of display present in an identical manner two means of indication which indicate two changes of trajectory which are carried out simultaneously (vertical and lateral); and in a second variant, said means of display present a global arrow corresponding to the vector sum of two arrows pertaining to two means of indication which indicate two changes of trajectory which are carried out simultaneously (vertical and lateral).

Moreover, advantageously, said means of display present (in particular vertically or horizontally) a plurality of means of indication, according to an order corresponding to the order of appearance of the corresponding changes of trajectory indicated.

In a second main embodiment, at least one of said first and second means of indication is associated with a guidance gauge which is also presented on said viewing screen. Preferably, said means of indication each comprise a bar.

In this case, advantageously, said first means of indication comprises a bar which is presented:

at the top of the guidance gauge, if the next vertical segment presents a positive slope; and at the bottom of the guidance gauge, if the next vertical segment presents a negative slope.

Furthermore, advantageously, said second means of indication comprises a bar which is presented:

to the right of the guidance gauge, if the next lateral branch is attained through a rightward rotation; and to the left of the guidance gauge, if the next lateral branch is attained through a leftward rotation.

In a particular embodiment, said means of display present a plurality of such bars in a differentiated manner as the case may be.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
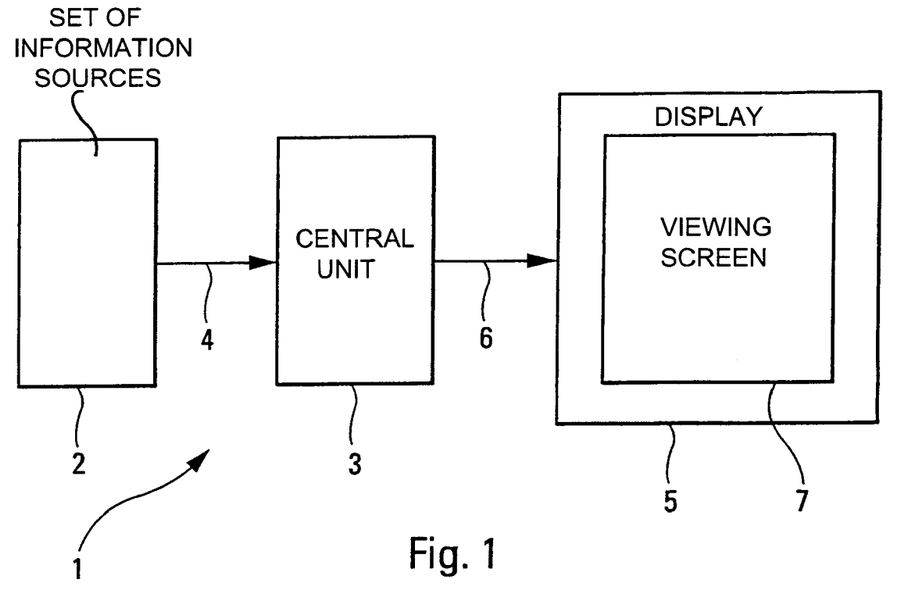
FIG. 1 is the schematic diagram of a device in accordance with the invention.

The flight control indicator 1 in accordance with the invention and represented diagrammatically in FIG. 1 is intended to aid the pilot of an aircraft, in particular of a military transport plane, during the flight control of this aircraft.

According to the invention, said flight control indicator 1 comprises:

a set 2 of information sources which know in particular the current position of the aircraft, the current speed of the aircraft and the flight trajectory along which said aircraft is guided. Within the framework of the present invention, this flight trajectory which is determined, for example, by an appropriate means integrated into said set 2 of information sources, comprises:

a vertical trajectory comprising a plurality of successive vertical segments, which are rectilinear and each present a particular slope; and a lateral trajectory comprising a plurality of successive lateral branches, which are rectilinear and each present a particular course;

a central unit 3 which is connected by a link 4 to said set 2 of information sources and which is able to determine any change of trajectory corresponding:

either to a vertical change, which represents a change of vertical segment, that is to say when the aircraft passes from a first vertical segment (presenting a first slope) to a second vertical segment (presenting a second slope) of said vertical trajectory;

or to a lateral change, which represents a change of lateral branch, that is to say when the aircraft passes from a first lateral branch (presenting a first course) to a second lateral branch (presenting a second course) of said lateral trajectory; and means of display 5:

which are connected by a link 6 to said central unit 3;

which are able to present on a viewing screen 7:

at least one first means of indication 8, 9 indicating at least the next vertical change; and at least one second means of indication 10, 11 indicating at least the next lateral change; and which are formed in such a way presented at least one of said first and second means of indication 8, 9, 10, 11, namely at least the one indicating the change of trajectory (both in terms of time and distance) which is closest, from the current position of the aircraft, during the flight of the aircraft along said flight trajectory.

Naturally, the present invention applies to any type of flight trajectory, whose lateral trajectory comprises lateral branches and whose vertical trajectory comprises vertical segments.

However, in a preferred embodiment, said flight trajectory which is determined by said set 2 of information sources, is a so-called "string-like" trajectory, whose lateral and vertical transitions respectively between lateral branches and vertical segments, are circular arcs with constant radii, which stem from considerations of maximum allowable load factors and preset speed. This flight trajectory is a predicted anticipated trajectory, determined with the aid of predicted climb and descent performance.

Within the framework of the present invention, said viewing screen 7 may in particular be a standard head-up screen, of the HUD ("Head Up Display") type, or a standard head-down flight control screen.

The flight control indicator 1 in accordance with the invention is therefore a device for aiding flight control, which makes it possible to reduce the workload of the pilot (which exists for the pilot in the standard situation, in particular to monitor and wait for the next changes of trajectory). By virtue of the invention, the pilot can thus concentrate rather on the flight control of the scheduled change of trajectory. It will be noted that a head-up viewing screen moreover presents the advantage, with respect to a head-down viewing screen, of avoiding the need for the pilot to have to ceaselessly change direction of gaze, between looking toward the front of the aircraft in respect of flight control and looking downward to watch the viewing screen.

Within the framework of the present invention, the displays effected by said means of display 5, in particular when they are applied to a head-up viewing screen 7, present a simplified symbology with in particular elementary shapes such as for example circular arcs, rectilinear segments and alphanumeric characters (and/or possibly easily distinguishable colors).

Figure 2:
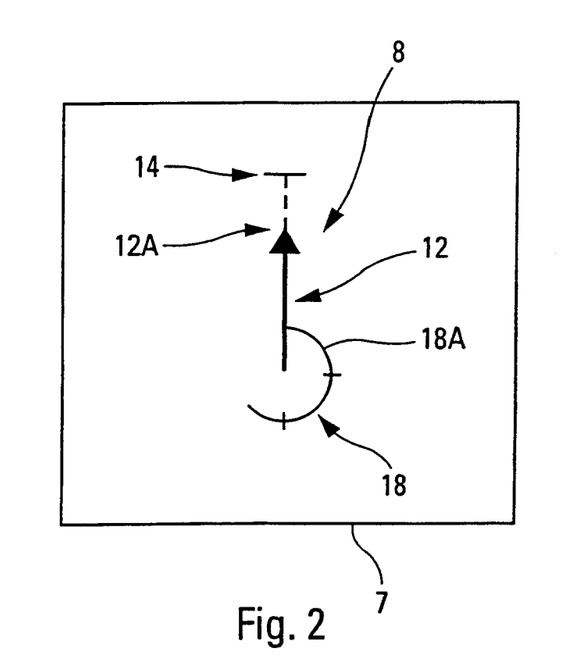
FIGS. 2 to 15 diagrammatically show means of indication in accordance with a first main embodiment of the invention.

In a first preferred main embodiment, represented in FIGS. 2 to 15, and adapted more specifically to a head-up viewing screen 7, said first and second means of indication 8 and 10 are autonomous on the viewing screen 7 with respect to other displays (not represented) of said viewing screen 7. Moreover, each of said first and second means of indication 8 and 10 comprises an arrow 12, 13, as represented in FIG. 2 for said first means of indication 8.

This first means of indication 8 which therefore indicates the next vertical change, comprises an arrow 12 which is directed:
 upward, if the next vertical segment presents a positive slope; and
 downward, if the next vertical segment presents a negative slope.

Figure 3:
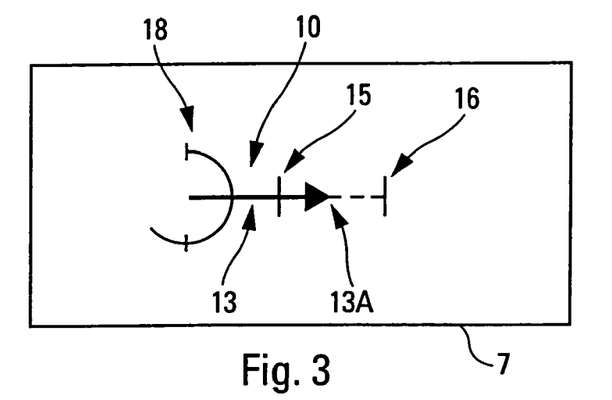

The length of the arrow 12, 13 of each of said means of indication 8 and 10 is dependent on an intensity specified hereinbelow, relating to the next change indicated. Furthermore, each of said means of indication 8 and 10 comprises, moreover, at least one bar 14, 15 and 16 which is associated with said arrow 12, 13 and which makes it possible to present a limit intensity for the next change indicated (maximum climb or descent slope for the vertical plane; maximum turning radius for the lateral plane).

More precisely, the length of the arrow 12 (means of indication 8) is dependent on the slope that the aircraft must fly to follow the next vertical segment, and the bar 14 indicates the maximum slope that the aircraft is in a position to fly.

This allows the pilot to anticipate the difficulty (the intensity) of flying along the next vertical segment, and the remaining slope margin (deviation between the end 12A of the arrow 12 and the bar 14) with respect to the maximum slope.

Furthermore, said means of indication 10 which makes it possible to indicate a next lateral change and which is represented in FIG. 3, comprises the arrow 13 which is directed:
 rightward, if the next lateral branch is attained through a rightward rotation; and
 leftward, if the next lateral branch is attained through a leftward rotation.

Furthermore, the length of said arrow 13 depends on the radius of the circular arc that the aircraft must fly (in rotation) to join up with the next lateral branch, and said bars 15 and 16 indicate respectively the minimum and maximum radii of a circular arc that the aircraft is in a position to fly to join up with a next lateral branch. The various margins are illustrated by the deviations between respectively the end 13A of the arrow 13 and said bars 15 and 16.

Figure 4:
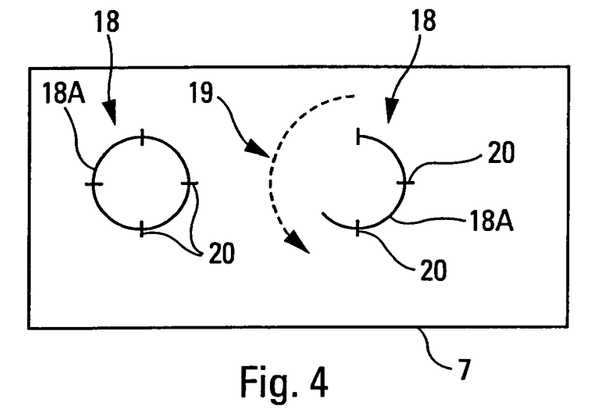

Each of said means of indication 8 and 10 comprises, moreover, a clock 18 which is presented in the form of a circle (or circular arc) 18A and which indicates the time remaining until the next change of trajectory, as illustrated for example in FIG. 4. This clock 18 therefore represents a countdown which commences at a given remaining time, before the next change of trajectory. This remaining time may be a time constant defined during the preparation of the mission, for example in accordance with the minimum length of a vertical segment and with the associated speed preset as the case may be. When the circle 18A is full, as represented in the left part of FIG. 4, the time remaining before the next change of trajectory is larger than said predefined time constant. On the other hand, as soon as the time remaining to the next change of trajectory becomes smaller than this time constant, the circular arc 18A decreases, as illustrated by an arrow 19 in the right part of FIG. 4, and does so until it disappears when the change of trajectory occurs. Next, a new complete circle (that is to say 360°) reappears as soon as said change of trajectory has occurred.

By way of example, a complete circle of this clock 18 may represent 60 seconds of flight. Hence, the circular arc 18A commences decreasing as soon as the aircraft is 60 seconds of flight from the next change of trajectory. Lines 20 on the circle (or the circular arc) 18A indicate intervals of time (for example every 15 seconds in the above example) and therefore make it possible to aid the pilot to estimate the remaining time better.

Another solution consists in considering the countdown to be initialized, at the moment of a change of trajectory, with the time remaining before the next change (and hence variable from one change to the next). The circular arc 18A then decreases during a time which corresponds to the predicted time of flight between two successive changes of trajectories. The rate of decrease of the circular arc 18A is therefore, in this case, a characteristic of the distance between two successive changes of trajectory.

The clock 18 is associated with a means of indication 8, 10 as represented in FIGS. 2 and 3.

Thus, by virtue of the invention, the indication of the time remaining takes a minimum amount of room on the viewing screen 7 and makes it possible to avoid the presentation of an additional numerical value on said screen.

In a particular embodiment, the various means of indication 8 and 10 which are presented on the viewing screen 7, are autonomous with respect to one another. In this case, in a preferred variant, said means of display 5 present a plurality of means of indication 8, 10 which are presented according to a particular order (defined for example horizontally from left to right, as represented in FIG. 5, or vertically from top to bottom) which corresponds to the order of appearance of the trajectory changes indicated by these various means of indication 8, 10 thus presented.

Figure 5:
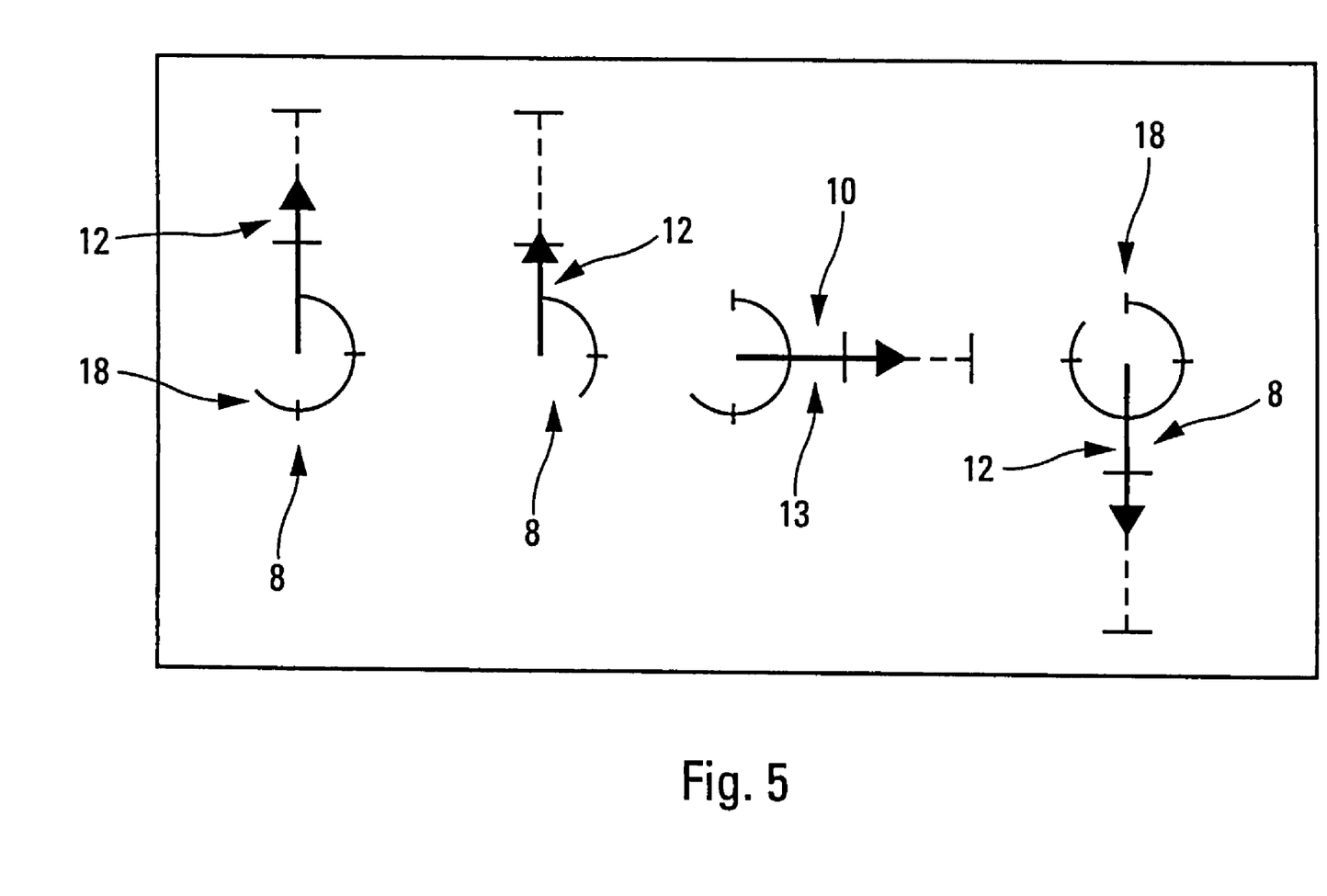

In the example of FIG. 5, the aircraft will encounter changes of trajectory culminating successively in:
 a vertical (climb) segment presenting a first positive slope;
 a vertical (climb) segment presenting a second positive slope that is smaller than said first positive slope;
 a lateral branch, to be attained through a rightward rotation; and
 a vertical descent segment therefore presenting a negative slope.

It will be noted that in this case, a single clock 18 is preferably envisaged, which is, after each change of trajectory, associated with the means of indication indicating the next change of trajectory.

Figure 6:
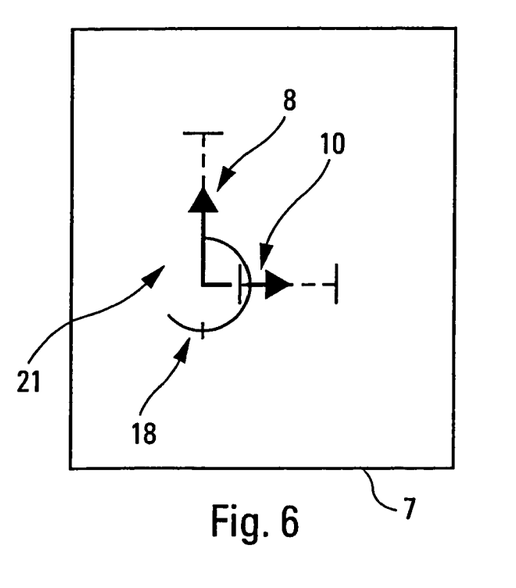

In a preferred embodiment, the means of display 5 present, on the viewing screen 7, a global indicator 21 comprising at least two means of indication 8, 10 and a single clock 18, as represented in FIG. 6. In this case, the clock 18 relates solely to the next change (vertical or lateral) scheduled.

Moreover, in order to ascertain which means of indication 8, 10 indicates the next change of trajectory, said means of display 5 present said two means of indication 8, 10 of said global indicator 21 in a differentiated manner. Such differentiation may be effected through different colors or through different plots, as is in the case in FIGS. 6 to 12, in which the means of indication corresponding to the next change is an unbroken line and the means of indication corresponding to another subsequent change is a broken line.

Naturally, said global indicator 21 is reupdated with each change of trajectory: for example, the second change becomes the first or next change, the third change becomes the second change, and so on and so forth.

In FIGS. 7 to 11, 13 and 15, the global indicator 21 is represented in the left part, in the current situation 22, and in the right part, in a subsequent situation 23, as illustrated by an arrow 24 depicting the passage from one situation to another.

Figure 7:
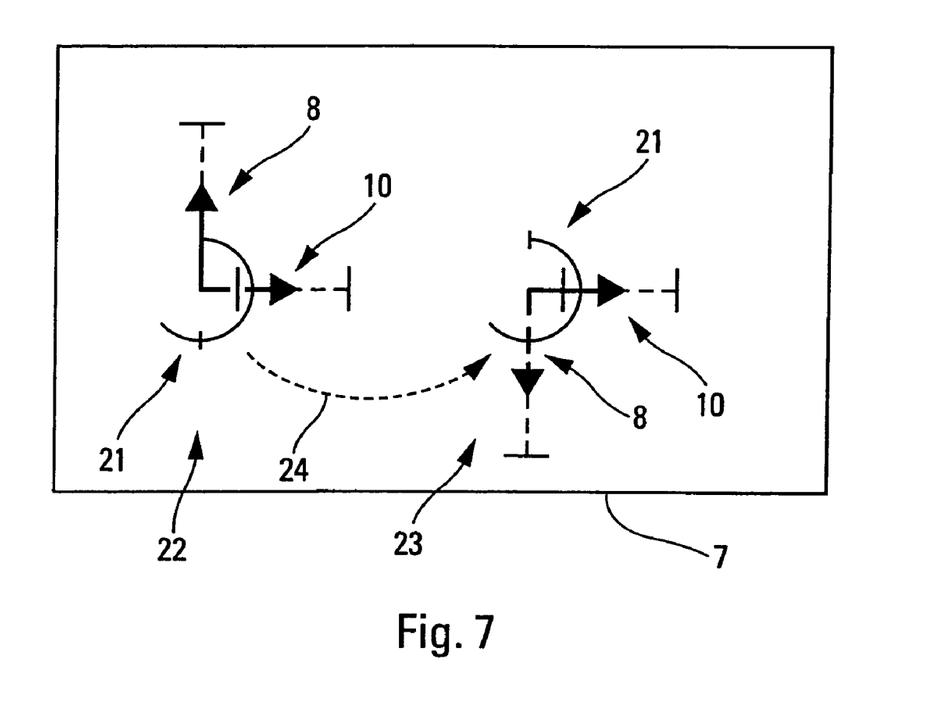

In the example of FIG. 7:
  in the current situation 22, the next change will culminate in a climb followed by a rightward rotation;
  when the change relating to the climb is effected, in the subsequent situation 23, the next change therefore relates to this rightward rotation, which will thereafter be followed by a descent.

Figure 10:
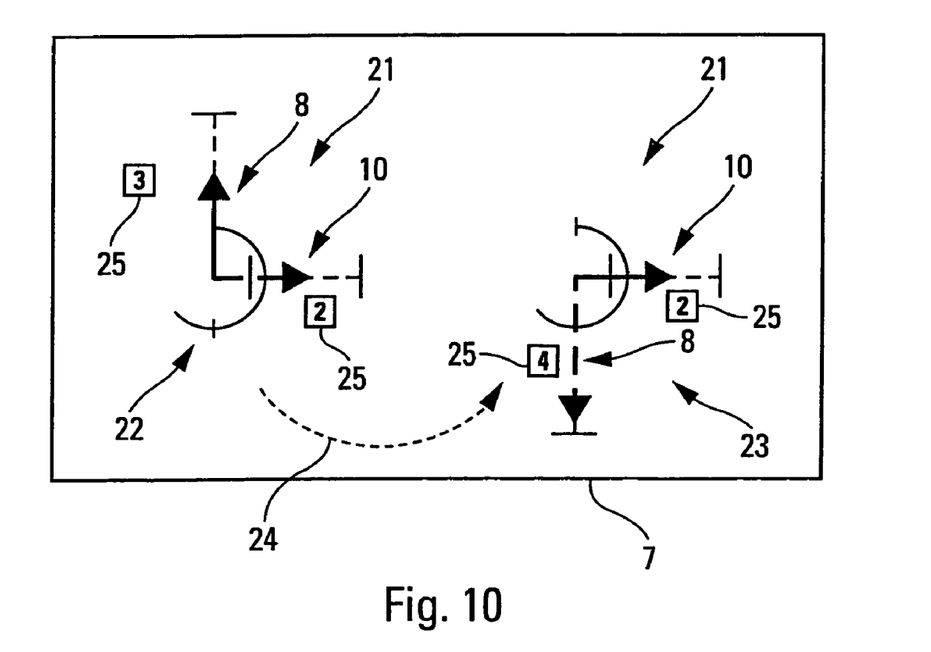
Figure 11:
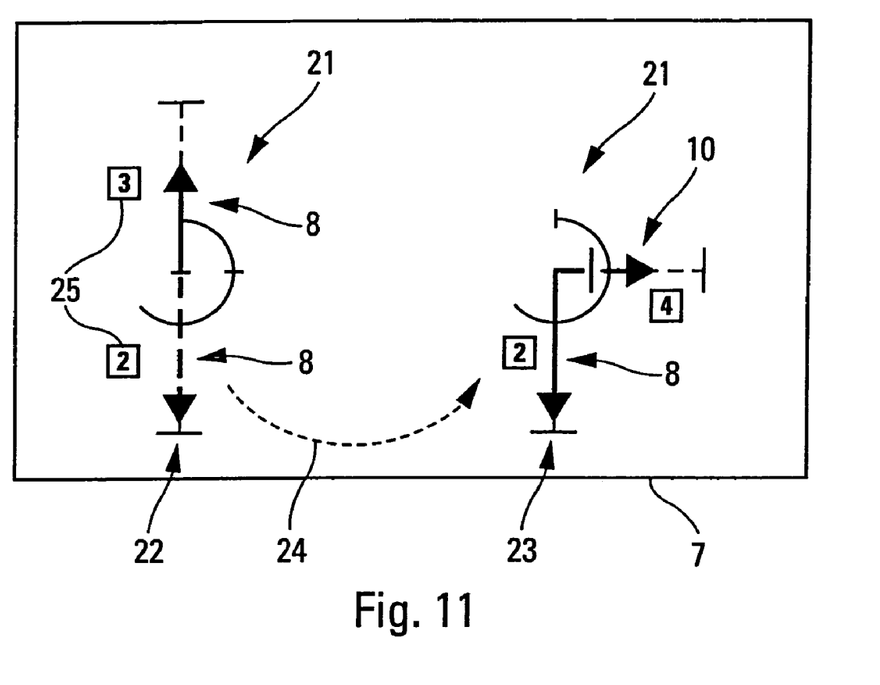

When the next two changes relate to the same geometrical plane (for example two climbs), two solutions are possible. A first solution is represented in FIGS. 8 and 9, and the second solution is represented in FIGS. 10 and 11.

Figure 8:
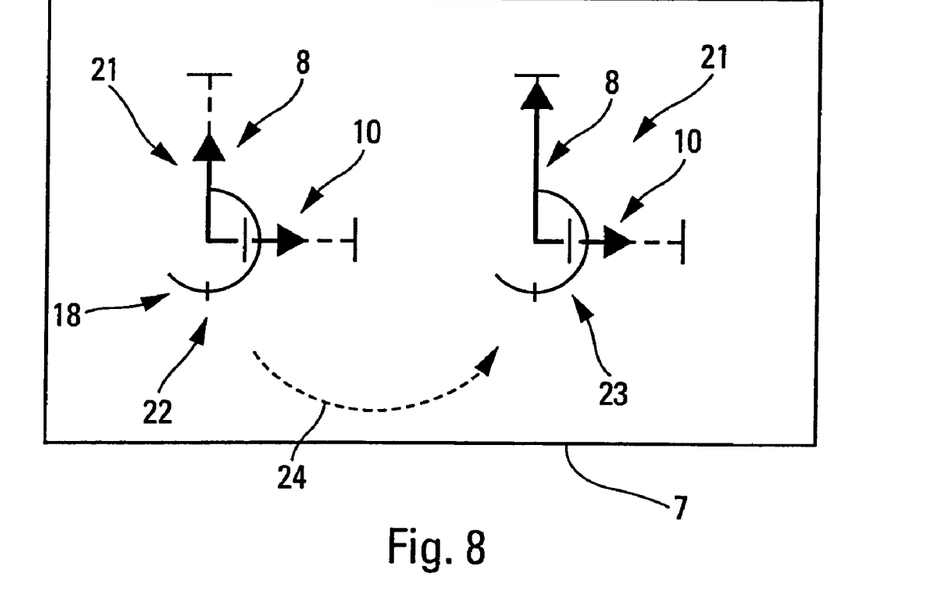

The first solution is illustrated in FIG. 8 with the aid of an example, according to which the aircraft will encounter changes of trajectory culminating successively in:
  a vertical climb segment;
  a vertical climb segment with a bigger slope; and
  a lateral branch to be attained through a rightward rotation.

The first solution consists in presenting on the viewing screen 7 solely the first vertical change with the first lateral change, even if this first vertical change and this first lateral change are not consecutive. In this case, when for example the first vertical change has been effected, the global indicator 21 shows the second vertical change (situation 23 with the means of indication 8 still an unbroken line), whereas the lateral change (means of indication 10) remains for its part a broken line. The vertical change represented by an unbroken line corresponds indeed to the closest change. The clock is reinitialized appropriately with each change.

Figure 9:
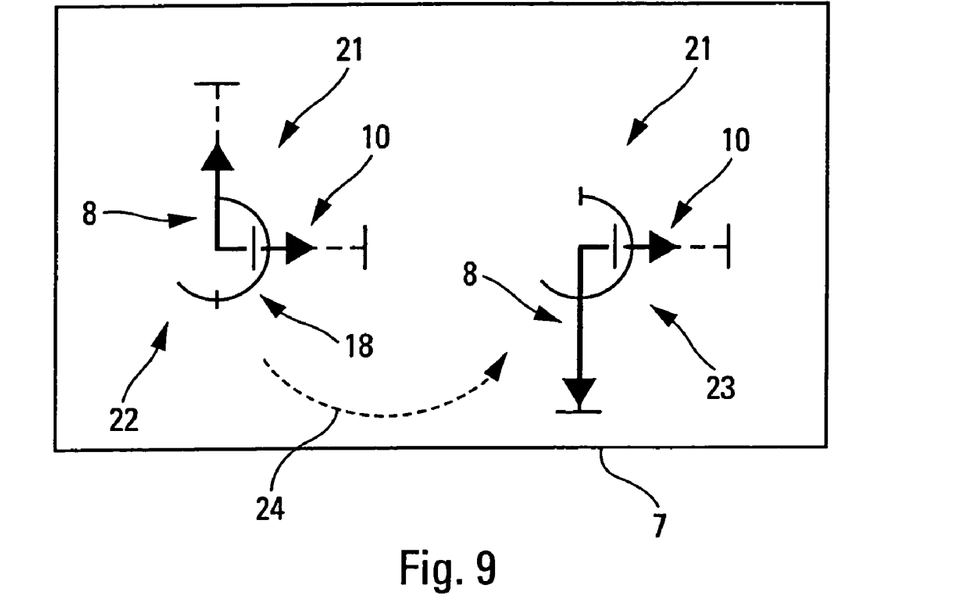

In the example of FIG. 9, which relates likewise to said first aforesaid solution, the next three changes of trajectory culminating:
  a climb;
  a descent; and
  a rightward change of course.

Consequently, the descent is displayed as an unbroken line after the climb in the situation 23, and the change of course remains a broken line.

A second solution consists in defining an auxiliary means of indication 25, for example an arrow or a numerical value, to indicate the number of consecutive changes of the same type.

In the example of FIG. 10, provision is made, in a consecutive manner, for:
  three climbs with different slopes;
  two rightward changes of course; and
  four descents with different slopes.

When a first change of trajectory is effected, the digit of the auxiliary means of indication 25 is lowered by one unit and therefore goes from "three" to "two" for the very first change of trajectory from the situation 22.

When all the consecutive changes of one and the same type have been effected, the principle is reinitialized with the type of the subsequent changes, as illustrated by the situation 23. In the example represented, the two rightward changes of course are therefore followed by four consecutive descents. Moreover, the means of indication 10 goes from a broken line plot (situation 22) to an unbroken line plot (situation 23).

Furthermore, in the example of FIG. 11, there are, consecutively:
  three climbs at different slopes;
  two descents at different slopes; and
  four rightward changes of course.

Additionally, in the case where lateral and vertical changes are effected simultaneously, two solutions are likewise proposed.

Figure 12:
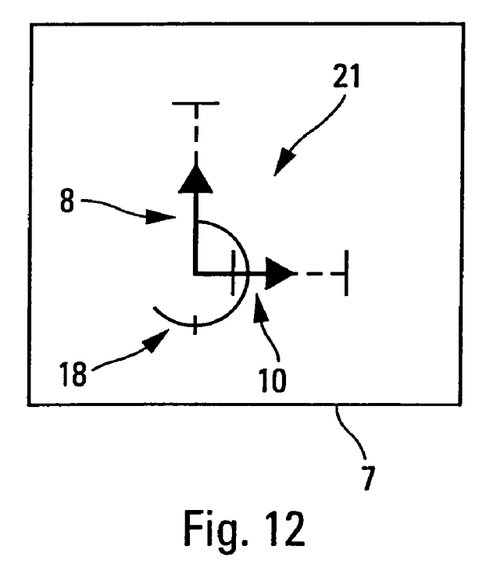

In a first solution, the two means of indication 8 and 10 are represented in an identical manner (as an unbroken line for example), as shown in FIG. 12. FIG. 12 indicates by way of example that the next two changes of trajectory which will be effected simultaneously relate to a climb and a rightward rotation.

Figure 13:
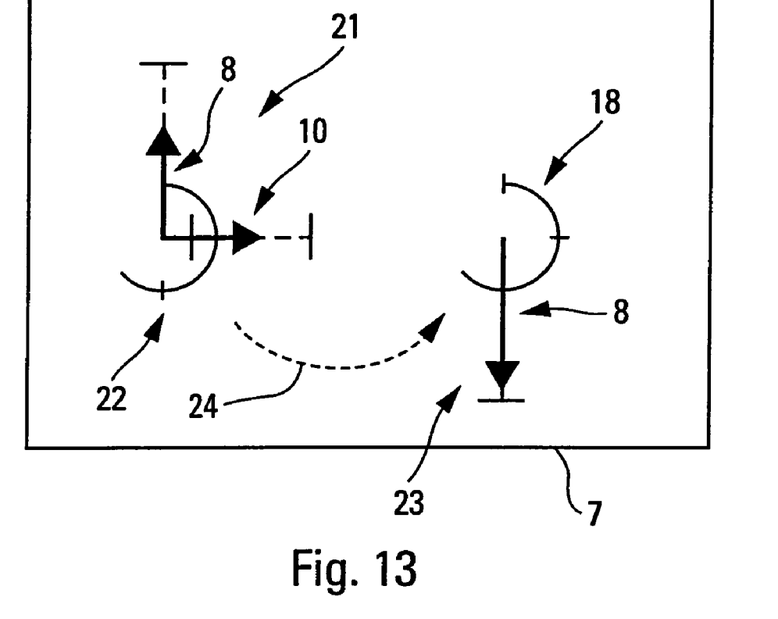

In this case, when the various changes of trajectory are represented one after the other, as illustrated in FIG. 5 for example, the situation of FIG. 13 is obtained when the change of trajectory which follows the aforesaid exemplary change (represented in FIG. 12) relates to a descent.

Figure 14:
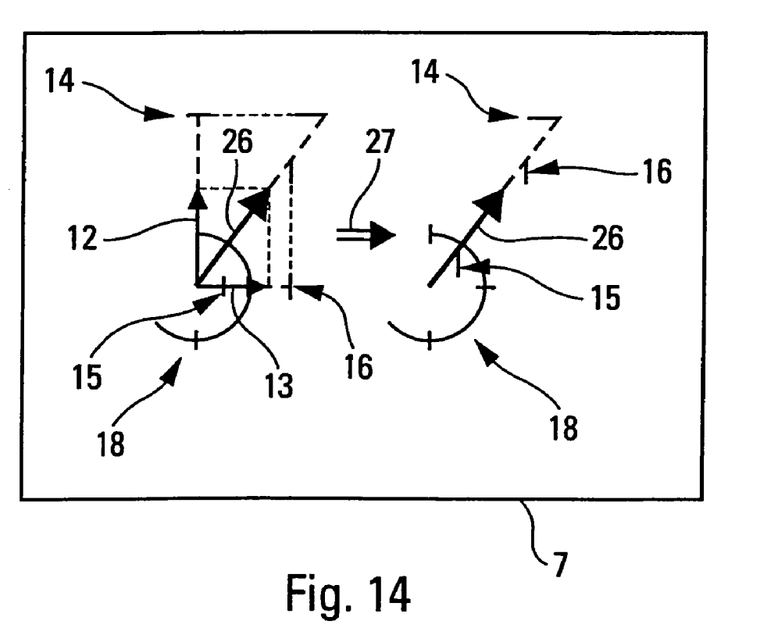

A second solution is such that said means of display 7 present a global arrow 26 corresponding to the vector sum of the two arrows 12 and 13 pertaining to two means of indication 8 and 10 which indicate two changes of trajectory which are effected simultaneously in two different planes, as represented in FIG. 14.

The left part of FIG. 14 simply illustrates the mode of determination of the means of indication displayed and represented on the right part, as shown by an arrow 27. This left part also makes it possible to explain the position of the bars 14, 15 and 16 on the means of indication of the right part.

Figure 15:
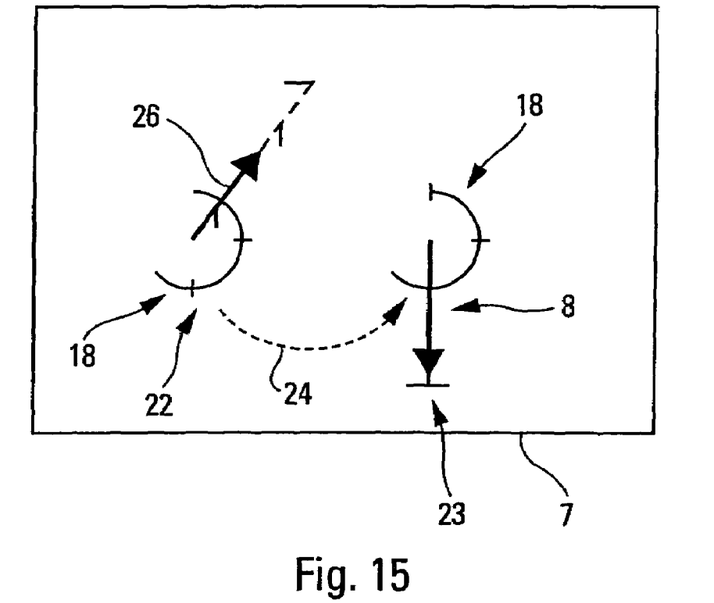

The particular example illustrated in FIG. 13 (pertaining to the first aforesaid solution) becomes such as illustrated in FIG. 15 with this second solution.

Figure 16:
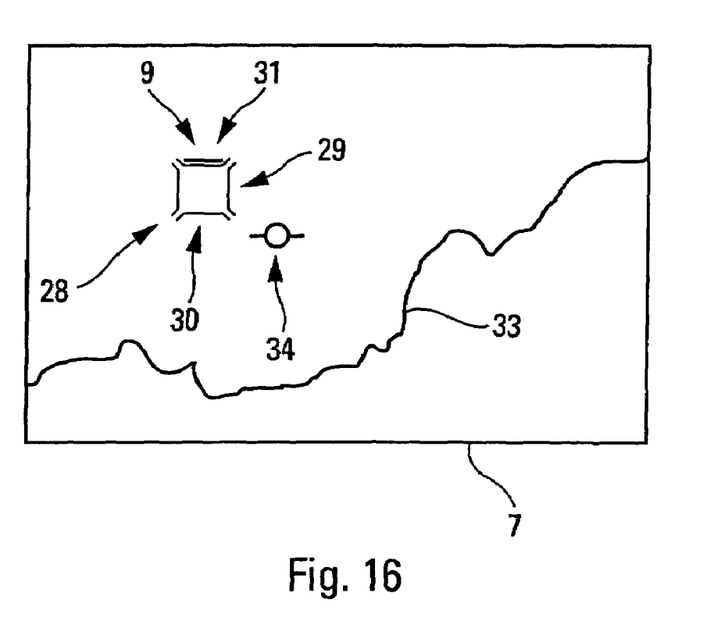
FIGS. 16 to 18 diagrammatically show means of indication in accordance with a second main embodiment of the invention.
Figure 17:
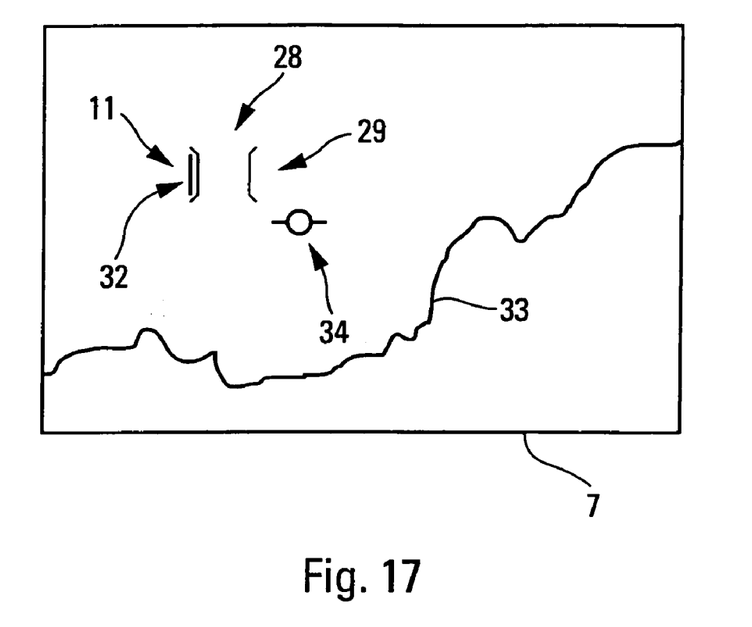
Figure 18:
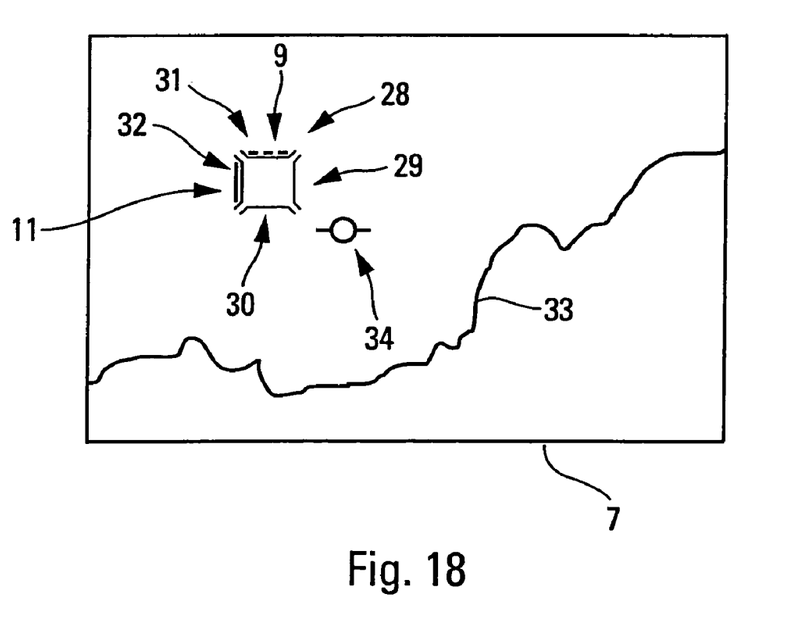

Additionally, in the second main embodiment represented in FIGS. 16 to 18, which is likewise applied to a head-up viewing screen 7, at least one of said first and second means of indication 9 and 11 is associated with a guidance gauge 28 which is likewise presented by said viewing screen 7, this making it possible to reduce the bulk of the display implemented by the flight control indicator 1 in accordance with the present invention.

In standard fashion, said guidance gauge 28 comprises:
  a vertical guidance indicator 29 comprising two vertical lines side by side, as represented in FIG. 17; and
  a lateral guidance indicator 30 comprising two overlaid horizontal lines.

Said lateral and vertical guidance indicators 29 and 30 may be represented jointly (FIGS. 16 and 18) or separately, as illustrated by FIG. 17 in which said vertical guidance indicator 29 alone is represented.

In this second main embodiment, a means of indication 9, 11 in accordance with the invention simply comprises a bar 31, 32. More precisely, said first means of indication 9 comprises the bar 31 which is presented:
  at the top of the vertical guidance indicator 29, if the next vertical segment presents a positive slope (FIGS. 16 and 18); and
  at the bottom of said vertical guidance indicator 29, if the next vertical segment presents a negative slope.

Furthermore, said second means of indication 11 comprises the bar 32 which is presented:
  to the right of the lateral guidance indicator 30, if the next lateral branch is attained through a rightward rotation; and
  to the left of said lateral guidance indicator 30, if the next lateral branch is attained through a leftward rotation (FIGS. 17 and 18).

When the guidance gauge 28 comprises two means of indication 9, 11, as represented in FIG. 18, the bars 31 and 32 may be differentiated so as to show which of the indicated changes of trajectories is the next change of trajectory. In particular, the next change of trajectory may be indicated by an unbroken line (bar 32 in FIG. 18) and the other change or changes of trajectory by broken lines (bar 31).

Naturally, when two lateral and vertical changes occur simultaneously, the two bars 31 and 32 may be of the same form, in particular an unbroken line.

Represented moreover in FIGS. 16 to 18 are:
the relief 33 visible overlaid on the viewing screen 7; and
an auxiliary means of indication 34 illustrating the ground speed vector of the aircraft.

The invention claimed is:

1. A flight control indicator for an aircraft which is guided along a flight trajectory which comprises:
   a vertical trajectory comprising a plurality of successive vertical segments, which are rectilinear and each represents a particular slope; and
   a lateral trajectory comprising a plurality of successive lateral branches, which are rectilinear and represent a particular course,
   which indicator comprises:
   a central unit able to determine any change of trajectory corresponding to a vertical change which represents a change of vertical segment or a lateral change which represents a change of lateral branch; and
   a display:
      which is able to present, on at least one viewing screen:
         at least one first indicator indicating at least one next vertical change; and
         at least one second indicator indicating at least one next lateral change; and
      which is formed in such a way as to present at least one of said first and second indicators, namely the one indicating the change of trajectory which is closest, from the current position of the aircraft.

2. The flight control indicator as claimed in claim 1, wherein said display simultaneously presents said first and second indicators.

3. The flight control indicator as claimed in claim 1, wherein said viewing screen is a head-up screen.

4. The flight control indicator as claimed in claim 1, wherein said viewing screen is a head-down flight control screen.

5. The flight control indicator as claimed in claim 1, wherein said first and second indicators are autonomous on the viewing screen, with respect to other displays of said viewing screen.

6. The flight control indicator as claimed in claim 5, wherein each of said first and second indicators comprises an arrow.

7. The flight control indicator as claimed in claim 6, wherein said first indicator comprises an arrow which is directed:
   upward if a next vertical segment presents a positive slope; and
   downward, if a next vertical segment presents a negative slope.

8. The flight control indicator as claimed in claim 6, wherein said second indicator comprises an arrow which is directed:
   rightward, if the next lateral branch is attained through a rightward rotation; and
   leftward, if the next lateral branch is attained through a leftward rotation.

9. The flight control indicator as claimed in claim 6, wherein a length of said arrow is dependent on an intensity relating to the next change of trajectory and each of said first and second indicators comprises, moreover, at least one bar which is associated with said arrow and which makes it possible to present a limit intensity for the next change indicated.

10. The flight control indicator as claimed in claim 9, wherein said first indicator comprises a single bar which indicates a maximum slope that the aircraft can fly.

11. The flight control indicator as claimed in claim 9, wherein said second indicator comprises two bars which indicate, respectively, a minimum and maximum turning radii that the aircraft can fly.

12. The flight control indicator as claimed in claim 5, wherein each of said first and second indicators comprises, moreover, a clock which indicates a time remaining until the next change of trajectory.

13. The flight control indicator as claimed in claim 12, wherein said clock is presented in the form of a circle, a representation of which diminishes progressively so that a remaining part is proportional to said remaining time.

14. The flight control indicator as claimed in claim 13, wherein the remaining time, indicated by a complete circle, corresponds to a predetermined duration.

15. The flight control indicator as claimed in claim 13, wherein the time remaining, indicated by a complete circle, corresponds to a predicted duration of flight of the aircraft, between a last change of trajectory and the next change of trajectory.

16. The flight control indicator as claimed in claim 5, wherein said first and second indicators are autonomous on the viewing screen.

17. The flight control indicator as claimed in claim 5, wherein said display presents a global indicator comprising said first and second indicators and a single clock.

18. The flight control indicator as claimed in claim 17, wherein said display presents said first and second indicators of said global indicator in a differentiated manner.

19. The flight control indicator as claimed in claim 17, wherein said display updates said global indicator, with each change of trajectory.

20. The flight control indicator as claimed in claim 17, wherein said display depicts, on one of said first and second indicators of said global indicator the number of next and consecutive changes relating to the type of change of trajectory indicated by this one indicator.

21. The flight control indicator as claimed in claim 17, wherein said display presents in an identical manner said first and second indicators which indicate two changes of trajectory which are carried out simultaneously.

22. The flight control indicator as claimed in claim 17, wherein said display presents a global arrow corresponding to a vector sum of two arrows pertaining to said first and second indicators which indicate two changes of trajectory which are carried out simultaneously.

23. The flight control indicator as claimed in claim 5, wherein said display presents said first and second indicators, according to a particular order corresponding to an order of appearance of the corresponding changes of trajectory indicated.

24. The flight control indicator as claimed in claim 1, wherein at least one of said first and second indicators is associated with a guidance gauge which is also presented on said viewing screen.

25. The flight control indicator as claimed in claim 24, wherein said first and second indicators comprise a bar.

26. The flight control indicator as claimed in claim 25, wherein said first indicator comprises a bar which is presented:

at the top of the guidance gauge, if a next vertical segment presents a positive slope; and at the bottom of the guidance gauge, if the next vertical segment presents a negative slope.

27. The flight control indicator as claimed in claim 25, wherein said second indicator comprises a bar which is presented:

to the right of the guidance gauge, if the next lateral branch is attained through a rightward rotation; and to the left of the guidance gauge, if the next lateral branch is attained through a leftward rotation.

28. The flight control indicator as claimed in claim 25, wherein said display presents a plurality of bars in a differentiated manner.

29. An aircraft, which comprises a flight control indicator such as that specified under claim 1.

* * * * *